March 12, 1968     E. A. FILIPPI ETAL     3,372,777

INERTIA-OPERATED STRAP LOCK

Filed March 28, 1966     2 Sheets-Sheet 1

INVENTORS
ERNEST A. FILIPPI
DONALD H. HERBERT
BY
Don Finkelstein
ATTORNEY

March 12, 1968 E. A. FILIPPI ET AL 3,372,777
INERTIA-OPERATED STRAP LOCK
Filed March 28, 1966 2 Sheets-Sheet 2

INVENTORS
ERNEST A. FILIPPI
DONALD H. HERBERT
BY
Don Finkelstein
ATTORNEY

United States Patent Office 3,372,777
Patented Mar. 12, 1968

3,372,777
INERTIA-OPERATED STRAP LOCK
Ernest A. Filippi, Northridge, and Donald H. Herbert, Rolling Hills Estates, Calif.; said Filippi assignor to Special Devices, Inc., a corporation of California
Filed Mar. 28, 1966, Ser. No. 549,737
(Filed under Rule 47(a) and 35 U.S.C. 116)
9 Claims. (Cl. 188—136)

ABSTRACT OF THE DISCLOSURE

There is disclosed herein a strap locking arrangement that automatically locks a strap or belt upon subjection to certain forces acting in pre-selected directions, when the forces have at least a predetermined magnitude. This is achieved by having a normally restrained belt snubbing means rotatably mounted on a housing and the belt snubbing means includes an over-centered spring actuated shaft in which an over-centered compression spring exerts a force to restrain the belt snubbing means in a normally restrained or open position. The belt snubbing means is movable from the normally restrained position through the center position, which is the position of maximum force, to a belt locking position by an actuator means. An inertia mass means is slidably mounted adjacent to the actuator means and, when the inertia mass means is subjected to the pre-selected forces there is relative movement between the inertia mass means and the actuator means so that the inertia mass means slides free of the actuator means to allow movement of the actuator means under the influence of a spring. The movement of the actuator means by the spring moves the belt snubbing means from the restrained position through the center position and into the belt locking position when the inertia mass means has been subjected to the pre-selected forces.

This invention relates to the strap locking art and more particularly to an improved arrangement for preventing movement of a strap or belt in response to preselected external forces.

In many applications, such as safety harnesses, strap restraints in automobiles, airplanes or the like, it is often desirable to have the harness that is worn by the occupant of the vehicle connected by a strap or belt to a reel. In normal movements, the strap or belt is relatively free to move to allow the wearer of the harness freedom of motion, the reel maintaining a slight tension in the strap to take up slack. However, when sudden acceleration forces are encountered, for example, it is desirable to prevent movement of the strap and thereby restrain the harness and the wearer thereof to prevent injury thereto.

Since rapid movement of vehicles in which such a harness would be utilized generally occur in the direction of travel of the vehicle and all the forces, which in this case are acceleration forces, may be considered to act only in the direction of travel and opposite thereto. Forces occurring perpendicularly to the direction of travel generally do not require restraint of the strap or the occupant since such forces are generally small in comparison to those occurring in the above-mentioned direction of travel, or opposite thereto.

Further, there are often occasions, particularly in aircraft, when the wearer of the harness knows that he will be subjected to comparatively large acceleration forces for which he desires to have the strap or belt hold the harness to restrain him from movement. Such forces may be encountered, for example, in landing an aircraft, in catapult takeoffs of an aircraft, or in other abrupt maneuvers. Knowing that these forces will be encountered, the occupant often desires to brace himself prior to the occurrence of these forces and consequently, it is desirable in a strap lock arrangement to allow manual operation thereof so that the user may place the lock into the locked position when he desires. At other times, the forces may occur unexpectedly and automatic locking of the strap or belt in response to such forces is desired. Further, it has been found desirable to be able to manually move the lock arrangement from a strap locking position to the normally open position, wherein the strap is allowed to pass freely through the lock arrangement, after the lock arrangement has, either through automatic operation in response to the preselected forces or manually, been moved into the strap or belt locking position in order to allow freedom of motion of the user until it is desired or necessary to have the strap or belt locked.

To the best of applicant's knowledge, no strap locking arrangements heretofore utilized have achieved these desiderata.

Accordingly, it is an object of applicant's invention herein to provide an improved strap locking arrangement.

It is another object of applicant's invention herein to provide an improved strap locking arangement that positively actuates to lock a strap upon subjection to preselected forces or is manually operated and also may be manually moved from the lock position to the normal position to reset the strap lock.

It is yet another object of applicant's invention herein to provide the positive actuating strap locking arrangement having comparatively few moving parts and that is economical to manufacture and having a high degree of reliability.

The above and other objects are achieved, according to one embodiment of applicant's invention by providing, in a belt or strap locking arrangement of the type adapted to lock a strap or belt to prevent movement upon subjection to preselected forces acting in preselected directions and such forces having at least a predetermined magnitude, a normally restrained belt snubbing means having a belt engaging surface. The normally restrained belt snubbing means is rotatably mounted on a housing for movement between a normally restrained position and a belt locking position. The belt snubbing means includes, in this embodiment of applicant's invention, an overcentered spring actuated shaft in which an overcentered compression spring exerts a positive force to restrain the belt snubbing means in a normally restrained or open position and is moved through the center position thereof, which is a position of maximum force, to the belt locking position wherein the spring exerts a positive force to hold the belt snubbing means in the belt locking position.

An actuator means that is moved by an actuator spring slidingly engages the belt snubbing means to move the belt snubbing means between the normally restrained or open position into the belt locking position. The actuator means is prevented from movement by the sliding engagement of a portion of the actuator means with an inertia mass means.

The inertia mass means is slidingly mounted in the housing and constrained to move in preselected directions. When the inertia mass is subjected to acceleration forces exceeding a predetermined magnitude, there is relative movement between the inertia mass and the actuator means so that the inertia mass slides free of the actuator means to allow movement of the actuator means under the influence of the actuator spring. This movement of the actuator means by the actuator spring moves the belt snubbing means from the normally restrained position through the center position and into the belt locking position.

Means may also be provided for manually moving the belt locking arrangement between the belt locking position and the normally restrained position.

The above and other objects are more fully explained in the following detailed description taken together with the accompanying drawing wherein similar reference characters refer to similar elements throughout and in which.

Before detailing the description of applicants' improved belt locking arrangement, applicants wish to point out that applicants have chosen, as an example of the utilization of their improved belt locking arrangement, the application involved in locking a belt to prevent movement thereof upon the subjection of the belt locking arrangement to preselected acceleration forces. This application, of course, may be utilized in aircraft, automobiles, or other vehicles. However, it will be appreciated that other embodiments of applicants' invention may utilize preselected external forces other than acceleration forces for initiating operation of applicants' improved belt locking arrangement. Therefore, the following description of the preferred embodiment of applicants' invention is intended to be construed as an example of one embodiment thereof and is not intended to be limiting to the true scope and spirit of applicants' invention.

Figure 1:
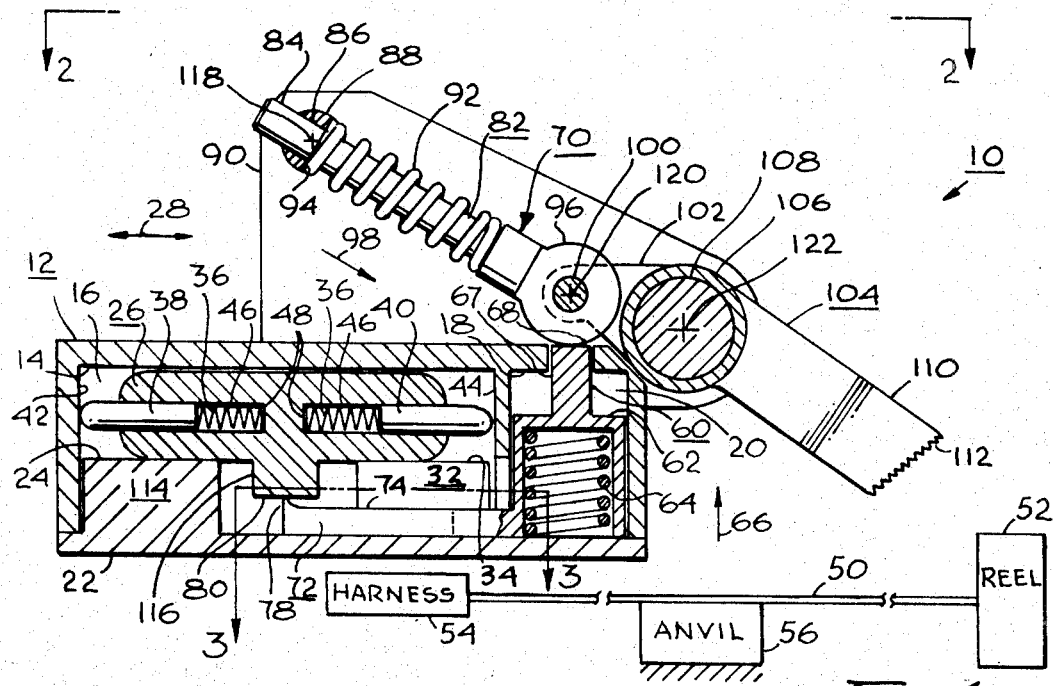
FIGURE 1 is a sectional view of one embodiment of applicant's improved belt locking arrangement in the normally restrained position.
Figure 2:
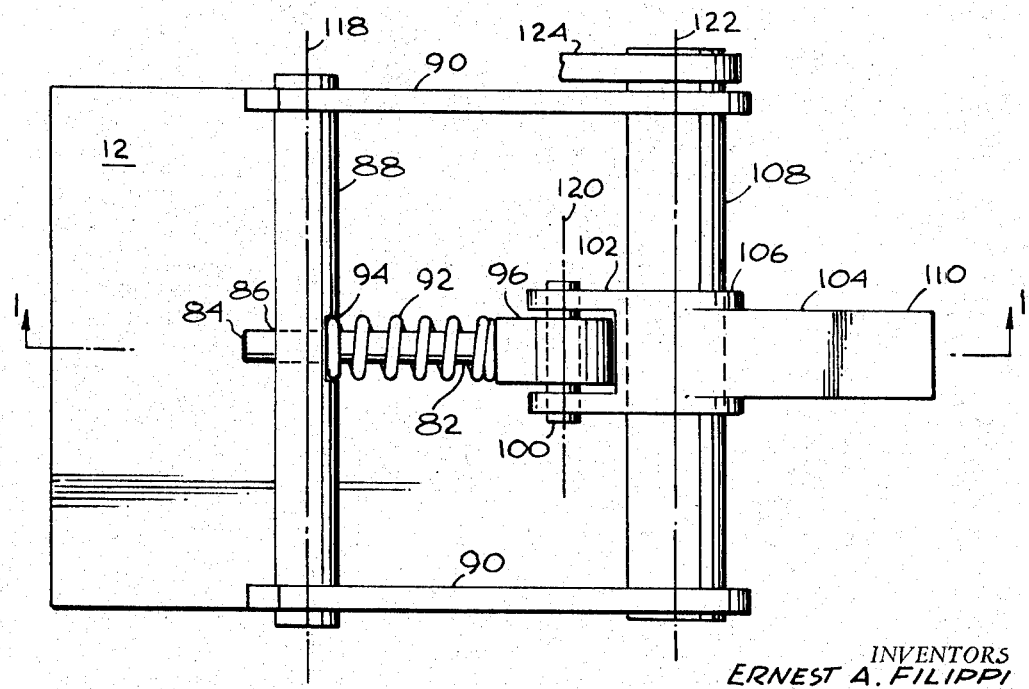
FIGURE 2 is a view along the line 2—2 of FIGURE 1.
Figure 3:
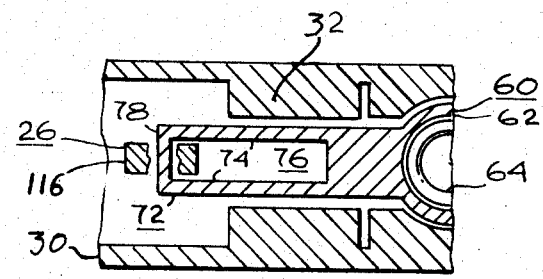
FIGURE 3 is a sectional view along the line 3—3 of FIGURE 1.

Referring now to FIGURES 1, 2 and 3, there is shown the structure associated with one embodiment of applicants' invention. As noted above, this embodiment illustrates the utilization of applicants' invention in an environment wherein a strap or belt is between a restraining harness, for example, as utilized in aircraft and other vehicles, and a harness reel utilized to take up slack in a strap or belt. The strap or belt is positively locked when subjected to certain preselected external forces such as acceleration forces.

As shown on the drawing, there is provided a strap lock arrangement, generally designated 10, according to the principles of applicants' invention herein. The strap lock arrangement 10 is comprised of a housing 12 having first walls 14 defining an inertia mass cavity 16 and second walls 18 defining an actuator cavity 20. The housing 12 also has a base 22 affixed thereto to close the bottom thereof. The base 22 has a wall portion 23 upon which an inertia mass 26 is slidingly mounted for reciprocal motion in the directions indicated by the arrow 28. Interior sidewall portions 30 (FIG. 3) of the housing 12 restrict motion of the inertia mass 26 so that it is constrained to move in the direction of the arrow 28. The interior walls 30 of the housing 12 also have a portion 32 with a surface 34 upon which the inertia mass 26 is slidingly supported so that the inertia mass 26 slides on the surfaces 24 and 34 in the direction, which may be considered a preselected direction, indicated by the arrow 28.

The inertia mass 26 is provided with pin receiving apertures 36 in opposite ends thereof and the pin receiving apertures 36 are aligned in the preselected direction as indicated by the arrow 28. A pair of pins 38 and 40 are slidingly mounted in the pin receiving apertures and are urged outwardly therefrom to bear against the internal wall portions 42 and 44 of the housing 12, respectively, under the urging of inertia mass springs 46. As can be seen from FIGURE 1, the inertia mass springs 46 are intermediate the pins 38 and 40 and the base portions 48 of the pin receiving apertures 36.

As shown in FIGURES 1, 2 and 3, applicants' improved belt locking arrangement 10 is shown in a normally restrained or open position wherein a belt or strap 50 intermediate a harness reel 52 and a harness 54 is free to move. That is, the harness reel 52, which may be of any conventional design or of the design indicated in co-pending patent application S.N. 549,738, filed concurrently herewith, is utilized to take up slack and maintain a light tension on the belt 50 to allow comparative freedom of movement of the wearer of the harness 54. However, when it is desired or, as described below, when certain external forces occur, the belt 50 is positively locked by the belt locking arrangement 10 against the anvil 56.

Within the actuator cavity 20, there is positioned an actuator means 60 comprising an actuator body member 62 and an actuator spring 64 intermediate the base 22 and the actuator body member 62 for urging the actuator body member in the direction indicated by the arrow 66. The body member 62 has an end 67 with first belt snubbing engagement surface 68 for sliding engagement with a belt snubbing means, generally indicated by the designation 70 and described below in greater detail.

As shown more clearly on FIGURE 3, the body member 62 also has a second end 72 for sliding engagement with the inertia mass 26. The second end 72 is bifurcated and provided with arms 74 in spaced apart relationship to define a channel 76 therebetween. The second end 72 is also provided with an inertia mass engaging surface portion 78 that slidingly engages an actuator engaging surface portion 80 of the inertia mass 26.

For the normally restrained position of the belt locking arrangement 10, shown on FIGURES 1, 2 and 3, there is provided a normally restrained belt snubbing means generally indicated at 70. The belt snubbing means has an overcenter spring loaded member 82 comprising a first end 84 that is slidingly mounted for reciprocal motion in a radial aperture 86 in a first shaft means 88. The radial aperture 86 is adapted to slidingly receive the first end 84 of the member 82.

The first shaft means 88 is journaled for rotational motion in flanges 90 of the housing 12. Thus, the member 82 is adapted to both rotatew ith the first shaft 88 and also to move reciprocatingly in the aperture 86.

A belt snubbing compression spring means 92 is intermediate a flattened portion 94 on first shaft 88 in regions adjacent the radial aperture 86 and abuts against the member 82 in regions adjacent a second end 96 thereof for urging the member 82 outwardly in the direction indicated by the arrow 98 from the first shaft 86. The second end 96 of the member 82 slidingly engages the surface 68 of the actuator body member 62 of actuator means 60.

The second end 96 of the member 82 is pivotly mounted by pivot pin means 100 to a clevis portion 102 of a belt lock means 104, having a first end 106, coupled to a second shaft 108 rotatably mounted in flanges 90 and in spaced apart relationship to the first shaft 88. The belt lock member 104 is adapted to rotate with the second shaft 108. The belt lock member 104 has a second end 110 upon which is a belt engaging surface 112 which, for example, may be serrated as shown on FIGURE 1, in order to provide a better belt engaging form for locking belt or strap means 50.

As shown on FIGURE 1, the member 82 is an overcenter spring loaded member in that in the normally restrained position a line joining the axis of rotation 118 of the first shaft means 86 with the axis 120 of pivot pin means 100 is not colinear with the axis of rotation 122 of the second shaft means 106. Consequently, under the urging of spring means 92 the second end 96 of the member 82 bears against the surface 68 of the actuator body member 62 in the normally restrained position and, further, maintains the belt locking member 104 away from belt engaging relationship with the anvil 56 in order that belt 50 may pass freely between anvil 56 and the belt engaging surface 112. This is achieved by the above-mentioned overcenter compression spring arrangement since the pivot pin means 100 is constrained to move in the arc of a circle defined by its separation from the axis of rotation 122 of second shaft 106.

The center position or maximum compression exerted on spring means 92 occurs when the axis of rotation 120 of the pivot pin means 100, the axis of rotation 118 of the first shaft means 86 and the axis of rotation 122 of the second shaft means 108 are colinear.

As described below, under the influence of preselected external forces, the belt snubbing means 70 is moved through the above-described center position to allow the spring means 92 to force the belt lock means 104 and more particularly the belt engaging surface 112 thereof into belt locking relationship with the anvil 56.

In operation, when the belt locking arrangement 10 is subjected to acceleration forces which, in this context, also includes deceleration forces acting in either of the directions indicated by the arrow 28, the inertia of the inertia mass 26 tends to resist the motion produced by the acceleration forces. Consequently, the inertia mass 26 moves relative to the actuator body member 62 against either of the inertia mass spring means 46 when subjected to such acceleration forces and the distance that the inertia mass 26 moves depends, of course, upon the spring constant of the inertia mass springs 46 and the magnitude of the acceleration forces as well as the mass of inertia mass 26. Thus, the spring constant of the inertia mass springs 46 determines the distance that the given inertia mass 26 will relatively move under the influence of given acceleration forces exerted on the belt locking arrangement 10.

When the acceleration forces achieve a value a predetermined amount greater than the forces exerted by spring constants of inertia mass springs 46, movement of the inertia mass 26 relative to the housing 12 and actuator body member 62 a preselected distance occurs. When the movement is sufficient so that the actuator engaging surface 80 moves closer to the portion 114 of the base 22, sliding engagement between surface 80 and the inertia mass engaging surface 78 of the actuator body member 62 will terminate and the portion 116 of the inertia mass 26 will be between the second end 72 of the actuator body member 62 and the portion 114 of the base 22. When this condition occurs, the actuator spring means 64 forces the actuator body member upwardly in the direction indicated by the arrow 66 and, because of the sliding engagement of the belt snubbing engagement surface 68 of the actuator body member 62 with the second end 96 of the member 82, the belt snubbing means 70 is moved through the center position, that is where the axis of rotation 118 of the first shaft means 86, the axis of rotation 120 of the pivot pin means 100 and the axis of rotation 122 of the second shaft means 108 are colinear, and under the urging of spring means 92, the belt locking means 104 is forced into belt locking relationship with the anvil 56, which position is illustrated in greater detail on FIGURE 4.

For the condition of the acceleration forces acting on the belt locking arrangement 10 in the direction opposite to the direction described above, the inertia mass 26 will move, relative to the housing 12 and the actuator body member 62, towards the actuator cavity 20 and, as shown on FIGURE 3, the portion 116 of inertia mass 26 will, if the external acceleration forces are of a sufficient magnitude and exist for a sufficient duration of time, be positioned above the channel 76 formed by the bifurcation of the second end 72 of the actuator body member 62. As such, once the sliding engagement of the actuator engaging surface 80 of the inertia mass 26 with the inertia mass engaging surface 78 of the actuator body member 62 is terminated, actuator spring 64 moves actuator body member 62 in the direction indicated by the arrow 66 to achieve the results as described above.

Figure 4:
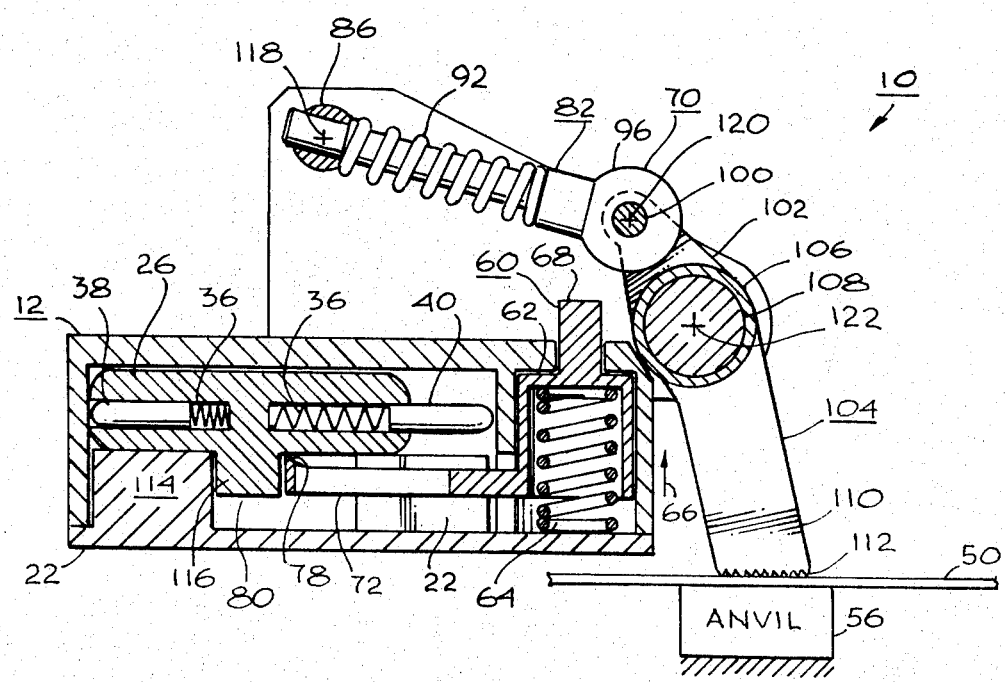
FIGURE 4 is a sectional view of the embodiment shown in FIGURES 1, 2 and 3 in the belt locking position.

Thus, it can be seen that for acceleration forces acting in either direction in a colinear alignment, the belt locking arrangement 10 is moved from a normally restrained position as shown on FIGURE 1 to a belt locking position as shown on FIGURE 4. The spring constant of the actuator spring means 64 determines the time lag after the acceleration forces have exceeded the level for a duration of time, as determined by the inertia springs 46, that positive belt locking will occur, and the spring 92 determines, primarily, the force exerted in the belt locking position and the normally restrained position.

As noted above, FIGURE 4 illustrates the belt locking arrangement 10 when it has been moved into the belt locking position. As shown on FIGURE 4, acceleration forces acting on the belt locking arrangement 10 have produced a relative movement of the inertia mass 26 relative to the housing 12 and the actuator body member 62 such that the portion 116 of the inertia mass 26 is positioned between the portion 114 of the base 22 and the second end 72 of the actuator body member 62. As such, sliding engagement of the inertia mass engaging surface 78 of the actuator body member 62 with the actuator engaging surface 80 of the inertia mass 26 has terminated and, under the influence of actuator spring 64, the actuator body member 62 has been moved in the direction indicated by arrow 66.

In commencing this transition from the position illustrated in FIGURE 1 to the position illustrated in FIGURE 4, the belt snubbing engaging surface 68 of the actuator body member 62 engaged the second end 96 of the member 82 of the belt snubbing means 70 and moved the second end 96 of the member 82 generally in the direction indicated by the arrow 66. However, the pivot pin 100 is constrained to move in an arc of a circle about the axis of rotation 122 of the second shaft means 108 and once the belt snubbing means 70 has passed through the center position, which as noted above, is a linear alignment of the axis of rotation 118 of the first shaft means 86, the axis of rotation 120 of the pivot pin means 110 and the axis of rotation 122 of the second shaft means 10, the spring means 92 forces continued rotation of the belt lock means 104 about the axis of rotation 122 of second shaft means 108 until the belt engaging surface 112 thereof pinches the belt or strap means 50 against the anvil 56. The anvil 56, as shown in FIGURES 1 and 4 may be affixed to structure other than the belt locking arrangement 10 as illustrated, for example, in the preferred embodiment of the applicants' invention shown on FIGURES 1 and 4. The spring constant of the spring 92 determines the force with which the belt or strap 50 is restrained between the belt engaging surface 112 of the second end 110 of the belt lock means 104 and the anvil 56.

It will be appreciated that the body member 62 of the actuator means 60 may be proportioned so that the belt snubbing means engaging surface 68 thereof may be in continuous contact with the second end 96 of the belt snubbing means 70. That is, the surface 68 could still be maintained in contact with the belt snubbing means 70 even after the belt snubbing means 70 has passed through the center position thereof, as may be desired.

In the preferred embodiment of applicants' invention, the second shaft means 108 is provided with a handle 124, shown on FIGURE 2, by which the belt snubbing means 70 may be manually moved, independently of the position of the actuator means 60 and the inertia mass means 26, from the normally restrained position shown in FIGURE 1 to the belt locking position shown in FIGURE 4, and back again.

Thus, rotation of the handle means 124 will produce the same effect on the belt locking means 70 as actuation by the actuator 60. Therefore, the utilizer of the belt locking arrangement 10 may, if desired, manually move the belt locking means 70 from the normally restrained position shown in FIGURE 1 to the belt locking position shown in FIGURE 4 or, conversely, from the belt locking position shown in FIGURE 4 back to the normally restrained position shown in FIGURE 1. The unique positioning of the operative parts of applicant's improved belt locking arrangement 10 allows either automatic operation under the influence of preselected external forces by means of the inertia mass 26 and the actuator means 60, or manual operation through the handle means 124 as may be desired by the utilizer thereof.

This concludes the description of applicants' improved belt locking arrangement. From the above, it can be seen that applicant has provided a belt locking arrangement that not only allows automatic operation, but also manual operation between a normally restrained position and a belt locking position, as may be desired by the utilizer. Further, applicants' improved belt locking arrangement has comparatively few moving parts and is highly reliable in operation and comparatively economic to fabricate.

Those skilled in the art may find many variations and adaptations of applicants' improved belt locking arrangement. Therefore, the following claims are intended to cover all such variations and adaptations falling within the true scope and spirit of applicants' invention.

What is claimed to be new and desired to be secured by Letters Patent of the United States is:

1. A belt locking arrangement comprising, in combination:
   a housing;
   a normally restrained belt snubbing means having a belt engaging surface and said belt snubbing means rotatably mounted on said housing, and said belt snubbing means further comprising:
      a belt lock means;
      an over-center spring loaded member pivotally coupled to said belt lock means and said belt lock means having said belt engaging surface and said over-center spring loaded member normally positioning said belt lock means in said normally restrained position;
   an inertia mass means slidingly mounted on said housing for reciprocal motion in preselected directions for moving preselected distances in response to preselected external forces acting thereon;
   an anvil means;
   an actuator means mounted in said housing slidingly engaging said belt snubbing means and said inertia mass means and responsive to movement of said inertia mass means for automatically moving said belt engaging surface of said belt snubbing means into belt locking relationship to said anvil means for the condition of the belt locking arrangement subjected to said preselected external forces, said actuator means slidingly engaging said over-center spring loaded member to move said overcenter spring loaded member through the center position thereof, for moving said belt lock means into said belt locking position, and said inertia mass means moved said preselected distances, and said actuator means manually movable independently of said external forces between said belt locking position and normally restrained position.

2. The arrangement defined in said claim 1 wherein said actuator means comprises a body member having a first end with a surface for sliding engagement with said belt snubbing means, and a second end with a surface for sliding engagement with said inertia mass means, and a spring means intermediate said body member and said housing for urging said body member into said sliding engagement with said belt snubbing means.

3. The arrangement defined in claim 1 wherein said belt snubbing means comprises:
   a belt lock means;
   an overcenter spring loaded member pivotally coupled to said belt lock means and said belt lock means having said belt engaging surface, and said overcenter spring loaded member normally positioning said belt lock means in said normally restrained position, and said overcenter spring loaded member movable from said normally restrained position through a center position thereof into said belt locking position;
   and said actuator means comprises:
   a body member having a first end with a surface for sliding engagement with said overcenter spring loaded member, and a second end with a surface for sliding engagement with said inertia mass means;
   and a spring means between said body member of said actuator means and said housing for urging said body member into said sliding engagement with said overcenter spring loaded member to move said overcenter spring loaded member and said belt lock member from said normally restrained position through the center position thereof and into said belt locking position.

4. The arrangement defined in claim 1 wherein said inertia mass means further comprises:
   wall portions defining a pair of oppositely directed pin receiving apertures aligned in said preselected directions;
   an actuator engaging surface;
   a pair of pins slidingly mounted in said pin receiving apertures;
   and a pair of inertia mass springs having predetermined spring constants mounted in said apertures, intermediate said pins and the base of said apertures for urging said pins outwardly for engagement with said housing;
   and said housing:
   having wall portions for constraining said inertia mass means for movement in said preselected direction, whereby said spring constants of said inertia mass springs controls said preselected distances said inertia mass moves upon subjection to said preselected external forces acting thereon.

5. The arrangement defined in claim 3 wherein said inertia mass means further comprises:
   walls defining a pair of oppositely directed pin receiving apertures aligned in said preselected directions;
   an actuator engaging surface for slidingly engaging said second end of said body member of said actuator means for the condition of the belt locking arrangement subjected to external forces having a magnitude less than the magnitude of said preselected external forces;
   a pair of pins slidingly mounted in said pin receiving apertures;
   a pair of inertia mass springs having predetermined spring constants mounted in said apertures intermediate said pins and the base of said apertures for urging said pins outwardly for engagement with said housing;
   and said housing having:
   wall portions for constraining said inertia mass means for movement in said preselected directions;
   and movement of said inertia mass means in said preselected directions for said preselected distances terminates the engagement of said actuator engaging surface of said inertia mass means with said second end of said body member of said actuator means for allowing said actuator spring means to move said actuator body member to move said overcenter spring loaded member of said belt snubbing means from said normally restrained position into said belt locking position, and said predetermined spring constants of said inertia mass springs in said pin receiving apertures of said inertia mass means controlling said preselected distance said inertia mass moves upon subjection to said preselected external forces.

6. The arrangement defined in claim 1 wherein said inertia mass means further comprises:

walls defining a pair of oppositely directed pin receiving apertures aligned in said preselected directions;
an actuator engaging surface;
a pair of pins slidingly mounted in said pin receiving apertures;
a pair of inertia mass springs having predetermined spring constants mounted in said apertures intermediate said pins and the base of said apertures for urging said pins outwardly for engagement with said housing;
and said housing having:
walls for constraining said inertia mass means for movement in said preselected direction;
and said actuator means further comprising:
a body member having a first end for sliding engagement with said belt snubbing means and a second end for sliding engagement with said actuator engaging surface of said inertia mass means;
an actuator spring means intermediate said body member of said actuator means and said housing for urging said body member of said actuator means into said sliding engagement with said belt snubbing means for moving said belt snubbing means from said normally restrained position into said belt locking position.

7. The arrangement defined in claim 1 wherein said belt snubbing means further comprises:
a first shaft means and a second shaft means rotatably mounted in said housing means in spaced apart relationship, and said first shaft means having a radially positioned aperture therethrough;
a belt lock member coupled to said second shaft means for rotational motion therewith and having a first end with said belt engaging surface thereon, and a second end;
a member having a first end slidingly mounted in said radially positioned aperture in said first shaft means and adapted to rotate therewith, and a second end pivotally coupled to said second end of said belt lock member;
and a spring means intermediate said first shaft means and said member for urging said second end of said member outwardly from said first shaft means, and said second end of said member spaced a first separation from said first shaft means for said belt snubbing member in said normally restrained position, said second end of said member spaced a second separation from said shaft means for said belt snubbing member in said belt locking position, and said second end of said member spaced a third separation from said first shaft means for said member in a position intermediate said normally restrained position and said belt locking position, and said third separation is less than said first and said second separation;

and handle means coupled to said second shaft means for allowing manual rotation of said second shaft means to move said belt locking member between said normally restrained position and said belt locking position independently of the subjection of the belt locking arrangement to said preselected external forces.

8. The arrangement defined in claim 7 wherein said actuator means comprises:
a body member having a first end with a surface for sliding engagement with said second end of said member of said belt snubbing means and a second end with a surface for sliding engagement with said inertia mass means; and
an actuator spring means for urging said body member into said sliding engagement with said second end of said member of said belt snubbing means.

9. The arrangement defined in claim 8, wherein said inertia mass further comprises:
walls defining a pair of oppositely directed pin receiving apertures aligned in said preselected directions;
an actuator engaging surface for sliding engagement with said second end of said body member of said actuator means;
a pair of pins slidingly mounted in said pin receiving apertures;
a pair of inertia mass springs having predetermined spring constants in said apertures intermediate said pins and the base of said apertures for urging said pins outwardly for engagement with said housing;
and said housing having:
wall portions for constraining said inertia mass means for movement in said preselected directions,
whereby said spring constants of said inertia mass springs control said preselected distances that said inertia mass moves upon subjection of the locking arrangement to said preselected external forces and subjection of the locking arrangement to said preselected external forces moves said actuator engaging surface of said inertia mass means out of engagement with said second end of said body member of said actuator means to allow movement of said actuator body member under the urging of said actuator spring means for moving said belt snubbing means from said normally restrained position into said belt locking position.

References Cited
UNITED STATES PATENTS 3,237,729 3/1966 Proctor _____ 188—136
3,241,205 3/1966 Genin _____ 280—150 X DUANE A. REGER, *Primary Examiner.*